United States Patent
Purpura et al.

(10) Patent No.: US 6,935,564 B2
(45) Date of Patent: Aug. 30, 2005

(54) CIRCUIT AND METHOD FOR CORRECTING INFLUENCE OF AC COUPLING

(75) Inventors: Paul E. Purpura, Yorktown Heights, NY (US); Jerry Harper, Barnegat, NJ (US)

(73) Assignee: Bayer Healthcare LLC, Tarrytown, NY (US)

(*) Notice: Subject to any disclaimer, the term of this patent is extended or adjusted under 35 U.S.C. 154(b) by 347 days.

(21) Appl. No.: 09/918,035

(22) Filed: Jul. 30, 2001

(65) Prior Publication Data

US 2003/0019936 A1 Jan. 30, 2003

(51) Int. Cl.[7] .................................................. G06F 7/10
(52) U.S. Cl. .................... 235/462.28; 327/33; 327/91; 235/462.48
(58) Field of Search .................. 235/476, 462.06, 235/462.18, 462.25, 462.26, 462.27, 462.28, 462.29, 462.48; 327/33, 91, 178; 330/278; 382/270–275; 713/500–503

(56) References Cited

U.S. PATENT DOCUMENTS

| | | | | |
|---|---|---|---|---|
| 3,770,940 A | * | 11/1973 | Harr | 235/462.35 |
| 3,801,775 A | * | 4/1974 | Acker | 235/470 |
| 3,820,068 A | * | 6/1974 | McMillin | 382/272 |
| 3,847,346 A | * | 11/1974 | Dolch | 382/175 |
| 4,096,992 A | * | 6/1978 | Nojiri et al. | 235/462.18 |
| 4,160,156 A | * | 7/1979 | Sherer | 235/462.05 |
| 4,516,017 A | * | 5/1985 | Hara et al. | 235/462.28 |
| 4,694,182 A | * | 9/1987 | Howard | 250/566 |
| 4,806,741 A | * | 2/1989 | Robertson | 235/462.1 |
| 4,818,886 A | * | 4/1989 | Drucker | 250/566 |
| 4,868,375 A | * | 9/1989 | Blanford | 235/462.15 |
| 4,983,817 A | * | 1/1991 | Dolash et al. | 235/462.04 |
| 5,258,749 A | * | 11/1993 | Endo | 345/10 |
| 5,280,162 A | * | 1/1994 | Marwin | 235/462.31 |
| 5,281,800 A | * | 1/1994 | Pelton et al. | 235/462.06 |
| 5,331,142 A | * | 7/1994 | Takenaka | 235/462.18 |
| 5,453,604 A | * | 9/1995 | Narabu | 235/454 |
| 5,578,813 A | * | 11/1996 | Allen et al. | 250/208.1 |
| 5,672,317 A | * | 9/1997 | Buhler et al. | 422/65 |
| 5,852,286 A | * | 12/1998 | Coleman | 235/462.01 |
| 5,892,745 A | * | 4/1999 | Belser | 369/53.33 |
| 5,898,738 A | * | 4/1999 | Nagata et al. | 375/326 |
| 6,292,259 B1 | | 9/2001 | Fossey et al. | 356/237.2 |
| 6,409,085 B1 | * | 6/2002 | Gu | 235/462.11 |
| 6,510,994 B1 | * | 1/2003 | Zhu et al. | 235/454 |

* cited by examiner

*Primary Examiner*—Diane I. Lee
*Assistant Examiner*—Kumiko C. Koyama
(74) *Attorney, Agent, or Firm*—Woodcock Washburn LLP

(57) ABSTRACT

A systems and method generate a progressively corrected scan signal, the progressively corrected scan signal having a magnitude independent of spectral reflectance from a background near a target. One of the methods involves generating a baseline signal by sampling light reflected from the target and background before transmitting a light scan at the target, generating a detected signal by receiving light reflected from the target and background while transmitting the light scan at the target, and subtracting the baseline signal from the detected signal to form the progressively corrected scan signal. One circuit embodiment produces an average level independent output signal from an input signal subject to fluctuations in average level.

25 Claims, 4 Drawing Sheets

CIRCUIT AND METHOD FOR CORRECTING INFLUENCE OF AC COUPLING

I. BACKGROUND

A. Field of the Invention

This invention relates generally to the field of electrical signal coupling, and more particularly to circuits and methods of coupling optically sensitive scan detectors to amplification stages.

B. Description of the Related Art

Bar code is a prominent automatic identification technology used to collect information about persons, places, or things. Bar codes work much like Morse Code in which dots and dashes represent letters and numbers. However, unlike Morse Code, information in bar codes is symbolized by bars and the spaces separating the bars. The bars and spaces vary by thickness depending on the type of symbology. The ratio of the dimensions between wide elements and narrow elements in a bar code is typically referred to as the wide to narrow ratio. The dimension of the narrow bars and spaces is typically referred to as the "X" dimension, and the dimension of the wide bars and spaces is a multiple of the X dimension. The wide to narrow ratio is preselected according to the symbology.

Most bar code readers are comprised of a laser, an optical timing detector for synchronizing the start of each scan by the reader, a rotating multifaceted mirror for passing a beam produced by the laser across the bar code during a scan period and diverting light reflected back at the reader during the scan period towards an optically sensitive scan detector, the optically sensitive scan detector converting the reflected light into an equivalent electrical signal, a logic detector for converting the equivalent electrical signal into unique logic states, and a coupling for carrying the equivalent electrical signal from the scan detector to the logic detector. Typically, the optically sensitive scan detector includes a field effect transistor (FET) input gain stage that impresses a direct current (DC) offset on the detected signal. As a result, the most common coupling employed between the scan detector and the logic detector is a resistor-capacitor (RC) coupling because it can be designed to remove the DC offset created by the scan detector. FIG. 1 shows a common RC coupling configuration comprising a resistor and a capacitor operatively connected to each other. FIG. 2 shows an exemplary output signal of the RC coupling depicted in FIG. 1. Note the DC offset of the output signal relative, to 0 volts DC.

Two common conditions in the vicinity of the bar code can have a negative effect on the output signal of the scan detector. The first condition is a fluctuation in background light level. As the level of background light in the vicinity of the bar code changes the output signal level of the optical detector during the non-scan or no laser reflectance periods varies as well. Usually the effect of this first condition on the operation of the reader is negligible and may be ignored. The second condition is the degree of spectral reflectance from the background on which the bar code is printed or attached. The more reflective the background and/or the closer to perpendicular the angle of incidence of the laser beam with the target the higher the degree of spectral reflectance received by the optical detector. However, the amount of light reflected from the barcode itself during both the scan and non-scan periods is relatively independent of background type and remains essentially the same. This results in the average DC level of the optical detector output signal varying with the degree of spectral reflectance from the background. Moreover, an RC coupling between the optical detector and the logic detector will not remove the effects of the changes in the average DC level of the optical detector output signal. If the spectral reflectance is high enough the effect can be to shift that portion of the optical detector output signal containing the bar code information outside the logic detector window of operation, thereby impairing the operation of the bar code reader. This condition is sometimes referred to as retro-reflectance.

To prevent retro-reflectance and compensate for the effects of spectral reflectance in general, highly reflective backgrounds are avoided where possible and fixed-mount bar code readers are typically designed with the lasers being pitched or offset a few degrees from perpendicular. The number of degrees from perpendicular that a laser must be placed to prevent bar code reader impairment is sometimes referred to as the reader's specular reflection zone. There are instances however where very useful information may be obtained from light reflected by a target in the vicinity of a highly reflective background during a scan period. For instance, where bar codes are being used to track and identify biological samples such as blood as they travel through an automated analysis system, it has been determined by the assignee of the present invention that information about the sample vessel itself (size, shape, fluid level, cover, insert, and the like) may be obtained from laser light reflected by the sample vessel in the vicinity of a highly reflective background. Accordingly, it would be very advantageous to use the optical detector output signal of a single bar code scanner for both purposes. Moreover, it would be highly advantageous if bar code readers could be designed so that no pitch or offset from perpendicular of the laser were necessary.

II. SUMMARY OF THE INVENTION

The invention encompasses a method of generating a progressively corrected scan signal, the progressively corrected scan signal having a magnitude independent of spectral reflectance from a background near a target, and comprising generating a baseline signal by sampling light reflected from the target and background before transmitting a light scan at the target, generating a detected signal by receiving light reflected from the target and background while transmitting the light scan at the target, and subtracting the baseline signal from the detected signal to form the progressively corrected scan signal. The target may be any number of things including, but not limited to, a barcode and a sample vessel.

The invention further encompasses a circuit for producing an average level independent output signal from an input signal subject to fluctuations in average level, and comprising a sample signal generator comprising an input and an output, the sample signal generator input receiving a sample timing signal, a sample-and-hold circuit comprising an input, an output, and a sample trigger, the sample-and-hold input receiving the input signal subject to fluctuations in average level, the sample trigger operatively coupled to the sample signal generator output, and a voltage amplifier comprising an input and an output, the amplifier input operatively coupled to the sample-and-hold output, the amplifier output operatively coupled to the sample-and-hold input. The input signal may comprise an optical detector output signal, and the optical detector signal may represent light reflected from a target and a background during a scan period.

III. BRIEF DESCRIPTION OF THE DRAWINGS

These and other features, aspects, and advantages of the invention will become better understood in connection with the appended claims and the following description and drawings of various embodiments of the invention where:

IV. DETAILED DESCRIPTION OF THE PREFERRED EMBODIMENTS

Figure 5:
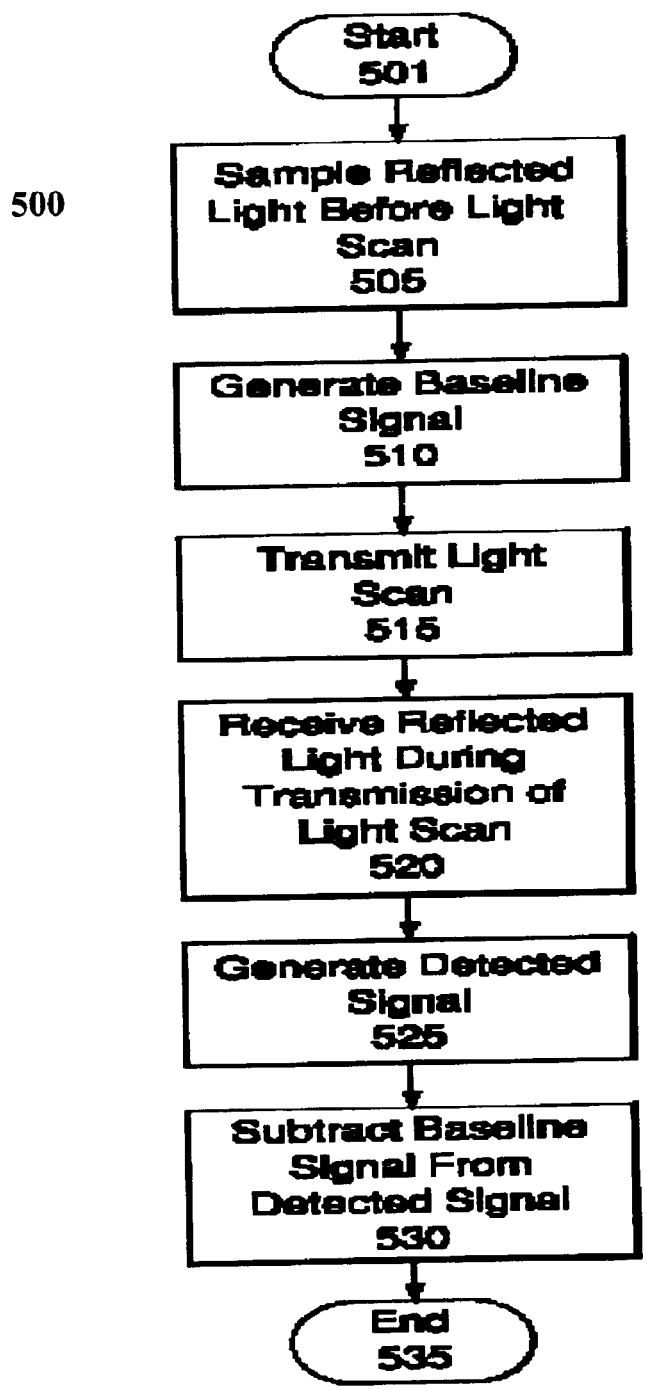
FIG. 5 shows a flow diagram of a method for generating a progressively corrected scan signal in accordance with one embodiment of the present invention.

Throughout the following detailed description similar reference numbers refer to similar elements in all the figures of the drawings. FIG. 5 shows a flow diagram of a method 500 for generating a progressively corrected scan signal in accordance with one embodiment of the invention. The process starts in step 501. In step 505 a sample of the light reflected from a target is taken immediately before a light scan is to be transmitted at the target. The target may comprise any number of objects and/or printing thereon including, but not limited to, bar codes and sample vessels. In step 510 the process generates a baseline signal by converting the sampled optical signal into an equivalent electric signal. In step 515 a light scan is transmitted at the target. In step 520 the process receives light reflected from the target while the light scan is being transmitted at the target. In step 525 the process generates a detected signal by converting the received optical signal during transmission of the light scan into an equivalent electrical signal. In step 520 the process generates the progressively corrected scan signal by electrically subtracting the baseline signal from the detected signal. In step 535 the process ends.

Figure 1:
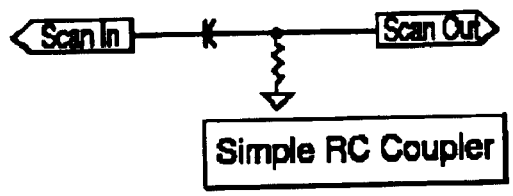
FIG. 1 shows a prior art coupling circuit.
Figure 2:
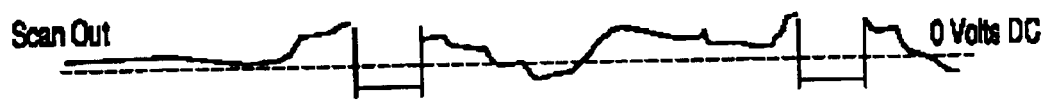
FIG. 2 shows an exemplary output signal of the coupling circuit depicted in FIG. 1.
Figure 3:
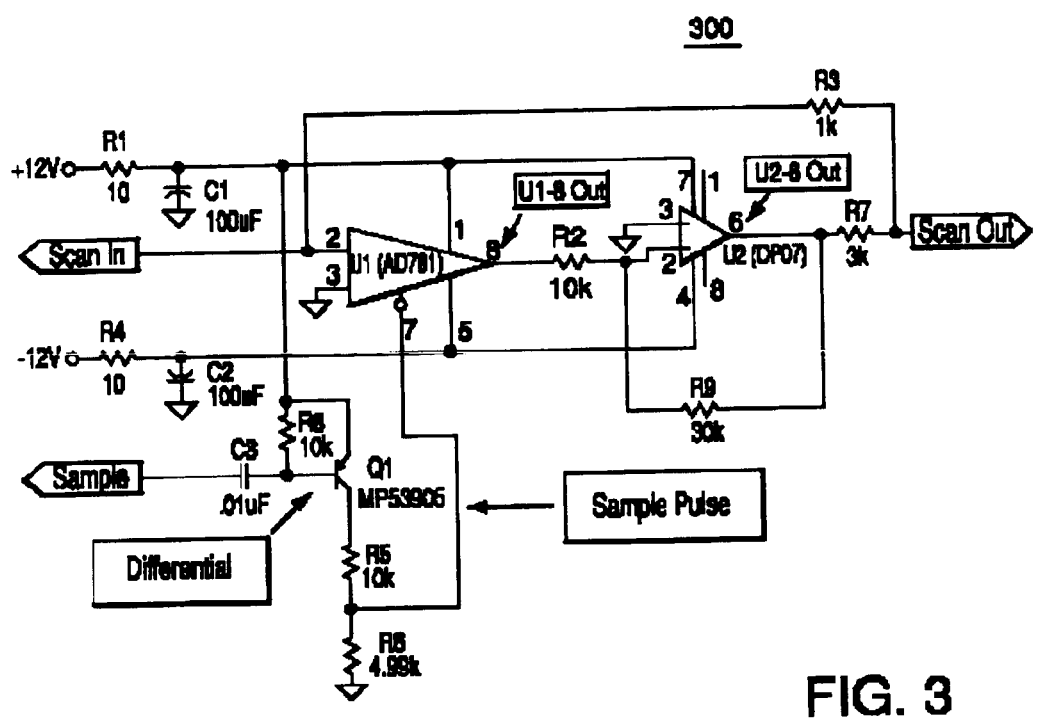
FIG. 3 shows a coupling circuit in accordance with a first embodiment of the invention.
Figure 4:
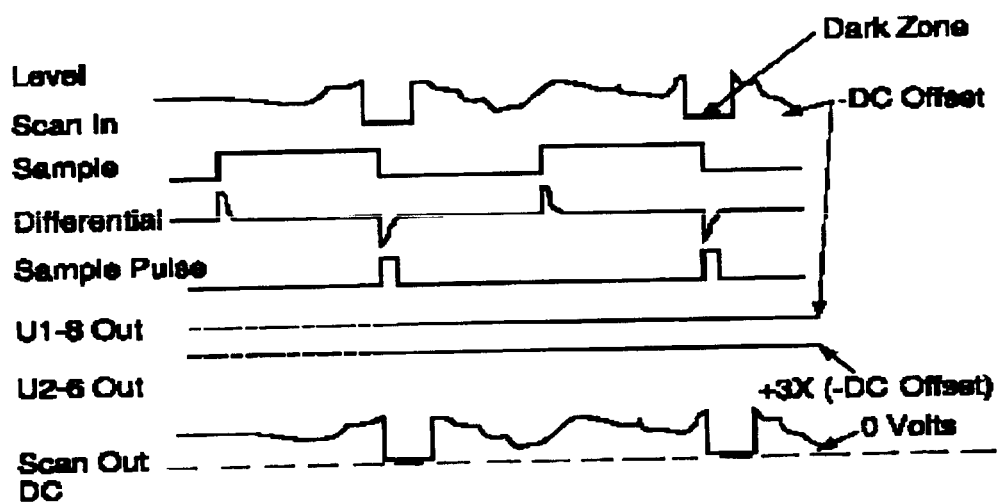
FIG. 4 shows an exemplary output signal and a number of signal waveforms at various points of the coupling circuit depicted in FIG. 3.

FIG. 3 shows a first embodiment of a coupling circuit 300 for implementing process 500 described in connection with FIG. 5. Circuit 300 is comprised of a sample signal generator, a sample-and-hold circuit, and a voltage amplifier. In this first embodiment of the invention the sample signal generator comprises a differentiator formed by capacitor C3 and resistor R8 and an inverting pulse amplifier Q1. The input of the differentiator receives a sample timing signal and the output of the differentiator is operatively coupled to the input of the inverting pulse amplifier (in this embodiment the base of PNP bipolar transistor Q1). An exemplary waveform of the sample timing signal is shown in FIG. 4 as Sample. The input waveform to inverting pulse amplifier Q1 is shown in FIG. 4 as Differential. The time constant of the differentiator is selected such that it can differentiate the edges of the sample timing signal received at the differentiator input. The output of the inverting pulse amplifier (in this embodiment the collector of PNP bipolar transistor Q1) is operatively coupled to the sample trigger of the sample-and-hold circuit. Resistors R5 and R6 place the inverting pulse amplifier output signal, whose waveform is shown in FIG. 4 as Sample Pulse, at the voltage level appropriate for the particular sample-and-hold circuit employed.

In circuit 300 the sample-and-hold circuit comprises a sample-and-hold circuit No. AD781 U1 having pins 1–8. Circuit U1 has an input comprising pins 2 and 3. U1 pin 3 comprises a reference input and is operatively coupled to ground. U1 pin 2 comprises a positive input and is configured to receive the input signal from a light scan detector. An exemplary waveform of an input signal from a light scan detector is shown in FIG. 4 as Scan In. The portion of the Scan In waveform labeled Dark Zone represents the voltage level of the input signal when no light scan is being transmitted at a target. U1 pin 7 comprises the sample trigger that is operatively coupled to the output of the sample signal generator. U1 pin 1 is operatively coupled to a positive voltage source and U1 pin 5 is operatively coupled to a negative voltage source. U1 pin 8 comprises the output of the sample-and-hold circuit and is operatively coupled to the input of the voltage amplifier through resistor R2. The waveform of the output signal generated at U1 pin 8 in the presence of the exemplary Scan In signal is shown in FIG. 4 as U1-8 Out.

Referring still to FIG. 3, the voltage amplifier in the circuit 300 embodiment of the invention comprises an Operational Amplifier No. 0P07 voltage amplifier U2 having pins 1–8. Amplifier U1 has an input comprising pins 2 and 3. U2 pin 3 is a positive input and is operatively coupled to ground. U2 pin 2 is a negative input and is operatively coupled to sample-and-hold circuit U1 output pin 8 through resistor R2. U2 pin 2 is also operatively coupled to U2 output pin 6 through resistor R9. The gain of voltage amplifier U2 is determined by the ratio R9:R2. In this embodiment of the invention R9 has a value of 30 k ohms and R2 has a value of 10 k ohms, which produces a gain of 3. U2 pin 7 is operatively coupled to a positive DC voltage source and U2 pin 4 is operatively coupled to a negative DC voltage source. U2 pins 1 and 8 are left open. The waveform of the output signal generated by U2 at pin 6 in the presence of the exemplary Scan In signal is shown in FIG. 4 as U2-6 Out.

Resistors R7 and R3 form two branches of a summing junction which is fed by the Scan In signal and the output of the voltage amplifier. In particular, voltage amplifier U2 pin 6 is operatively coupled to the branch of the summing junction containing resistor R7 and sample-and-hold circuit U1 pin 2 is operatively coupled to the branch containing R3. The ratio of R3:R7 controls the amount by which the voltage of the Scan In signal is attenuated. In the circuit 300 embodiment of the invention R3 has a value of 1 k ohms and R7 has a value of 3 k ohms which results in approximately a 25% reduction in the magnitude of the Scan In signal. The waveform of the output signal produced by circuit 300 in the presence of the exemplary Scan In signal is shown in FIG. 4 as Scan Out.

In operation, circuit 300 continuously receives the output (Scan In) of a light scan detector (not shown) at the sample-and-hold circuit U1 input and the leg of the summing junction containing resistor R3. Circuit 300 also continuously receives a sample timing signal (Sample), a periodic square wave, at the input to the differentiator formed by capacitor C3 and resistor R8. The period of time immediately before a light scan is about to be transmitted corresponds to a period of time following the trailing edge of the Sample signal. When the trailing edge of the Sample signal is presented to the differentiator a negative pulse is produced at the output of the differentiator (Differential). The negative pulse produced at the output of the differentiator is received at the input to the bipolar transistor Q1 and causes transistor Q1 to produce a positive pulse at its output (Sample Pulse). The positive pulse produced at the output of transistor Q1 is received at the sample-and-hold circuit sample trigger. Receipt of the positive pulse at the sample trigger causes sample-and-hold circuit U1 to capture the voltage level of the Scan In signal during the Dark Zone or zero light scan reflectance from the target portion of the Scan In signal and continuously output that Dark Zone voltage level (U1-8 Out) to the voltage amplifier U2 input until the next positive pulse is received. Voltage amplifier U2 inverts and amplifies the U1-8 Out signal it receives from sample-and-hold circuit U1 (U2-6 Out). Finally, the summing junction formed by R3 and R7 combines the U2-6 Out signal with the Scan In signal to produce an output signal (Scan Out) having an absolute level or level independent of fluctuations in the average DC level of the Scan In signal.

While the invention has been described in connection with the embodiments depicted in the various figures, it is to be understood that other embodiments may be used or modifications and additions may be made to the described embodiments for performing the same function of the invention without deviating therefrom. For example, one skilled in the art will appreciate that each of the circuit elements described above in connection with the FIG. 3 embodiment of the invention may be implemented in any of a multitude of sub-circuit assemblies capable of performing the same functions as the depicted circuit elements. Moreover, the invention need not be implemented in hardware alone but may be embodied in a combination of hardware and software and/or software alone. Therefore, the invention should not be limited to any particular embodiment shown and described above, but rather construed in breadth and scope in accordance with the claims appended below.

We claim:

1. A circuit for producing an average level independent output signal from an input signal subject to fluctuations in average level, comprising:
   a sample signal generator comprising an input and an output, the sample signal generator input receiving a sample timing signal;
   a sample-and-hold circuit comprising an input, an output, and a sample trigger, the sample-and-hold input receiving the input signal subject to fluctuations in average level, the sample trigger operatively coupled to the sample signal generator output; and
   a voltage amplifier comprising an input and an output, the amplifier input operatively coupled to the sample-and-hold output, the amplifier output operatively coupled to the sample-and-hold input.

2. The circuit of claim 1 wherein the input signal comprises an optical detector output signal.

3. The circuit of claim 2 wherein the detector output signal represents light reflected from a target and a background during a scan period.

4. The circuit of claim 3 wherein the target comprises a barcode.

5. The circuit of claim 3 wherein the target comprises a sample vessel.

6. The circuit of claim 1 wherein the output signal has a baseline of about zero volts.

7. The circuit of claim 1 wherein the sample signal generator comprises a differentiator and a bipolar transistor, the differentiator comprising an input and an output, the differentiator input comprising the sample signal generator input, the differentiator output operatively coupled to the bipolar transistor.

8. The circuit of claim 7 wherein the differentiator comprises a capacitor and a resistor, the capacitor comprising an input and an output, the resistor comprising a first and a second terminal, the capacitor input comprising the sample signal generator input, the capacitor output operatively coupled to the first resistor terminal to form the differentiator output.

9. The circuit of claim of 7 wherein the bipolar transistor comprises a NPN bipolar transistor, the NPN bipolar transistor comprising a base and a collector, the transistor base operatively coupled to the differentiator output, the transistor collector comprising the sample signal generator output.

10. The circuit of claim 9 wherein the transistor further comprises an emitter, the emitter operatively coupled to a positive DC voltage source.

11. The circuit of claim 1 wherein the sample-and-hold input comprises a positive and a reference input, the reference sample-and-hold input operatively coupled to ground, the positive sample-and-hold input receiving the input signal subject to fluctuations in average level.

12. The circuit of claim 1 wherein the amplifier input comprises a positive and a negative input, the positive amplifier input operatively coupled to ground, the negative amplifier input operatively coupled to the sample-and-hold output.

13. The circuit of claim 1 wherein the amplifier output is operatively coupled to the sample-and-hold input via a first and a second resistor in series, the average level independent output signal being generated at a point between the first and second resistors.

14. The circuit of claim 13 wherein the ratio of the first resistor to the second resistor comprises 3:1.

15. A system for generating and transforming information contained in light reflected from an optical scan transmitted at a target in the vicinity of a background to information contained in an electrical signal, comprising:
   an optical timing detector for producing a scan synchronization signal, a laser for producing the optical scan in response to the scan synchronization signal, an optically sensitive scan detector for receiving and converting the reflected light into an electrical detector output signal, the detector output signal being subject to variations in DC offset due to spectral reflectance from the background, and a coupling circuit for presenting the scan detector output signal to a subsequent circuit;
   the coupling circuit comprising a sample signal generator, the sample signal generator comprising an input and an output, the sample signal generator input receiving a sample timing signal, a sample-and-hold circuit, the sample-and-hold comprising an input, an output, and a sample trigger, the sample-and-hold input receiving the scan detector output signal, the sample trigger operatively coupled to the sample signal generator output, and a voltage amplifier, the amplifier comprising an input and an output, the amplifier input operatively coupled to the sample-and-hold output, the amplifier output operatively coupled to the sample-and-hold input.

16. The circuit of claim 15 wherein the sample timing signal comprises the scan synchronization signal.

17. The circuit of claim 15 wherein the amplifier output signal has a baseline of about zero volts.

18. The circuit of claim 15 wherein the sample signal generator comprises a differentiator and a bipolar transistor, the differentiator comprising an input and an output, the differentiator input comprising the sample signal generator input, the differentiator output operatively coupled to the bipolar transistor.

19. The circuit of claim 18 wherein the differentiator comprises a capacitor and a resistor, the capacitor comprising an input and an output, the resistor comprising a first and a second terminal, the capacitor input comprising the sample signal generator input, the capacitor output operatively coupled to the first resistor terminal to form the differentiator output.

20. The circuit of claim of 19 wherein the bipolar transistor comprises a NPN bipolar transistor, the NPN bipolar transistor comprising a base and a collector, the transistor base operatively coupled to the differentiator output, the transistor collector comprising the sample signal generator output.

21. The circuit of claim 20 wherein the transistor further comprises an emitter, the emitter operatively coupled to a positive DC voltage source.

22. The circuit of claim 15 wherein the sample-and-hold input comprises a positive and a reference input, the reference sample-and-hold input operatively coupled to ground, the positive sample-and-hold input receiving the scan detector output input signal.

23. The circuit of claim 15 wherein the amplifier input comprises a positive and a negative input, the positive amplifier input operatively coupled to ground, the negative amplifier input operatively coupled to the sample-and-hold output.

24. The circuit of claim 15 wherein the amplifier output is operatively coupled to the sample-and-hold input via a first and a second resistor in series.

25. The circuit of claim 24 wherein the ratio of the first resistor to the second resistor comprises 3:1.

* * * * *